June 13, 1950     L. GUTHRIE ET AL     2,511,057
SHRIMP TRAWLING NET
Filed Feb. 13, 1947

Inventors
Louis Guthrie
Charles L. Guthrie

Patented June 13, 1950

2,511,057

UNITED STATES PATENT OFFICE 2,511,057

SHRIMP TRAWLING NET

Louis Guthrie and Charles L. Guthrie,
Morehead City, N. C.

Application February 13, 1947, Serial No. 728,286

2 Claims. (Cl. 43—9)

This invention relates to shrimp trawling nets, and has particular reference to an improved tail bag for such a net.

The primary object of the present invention is to so construct the tail bag of a shrimp trawling net that shrimp will be effectively prevented from escaping from the bag although the escape of small fish of the waste variety is permitted.

The exact nature of the present invention will become aparent from the following description when considered in connection with the accompanying drawing, in which.

Figure 1:
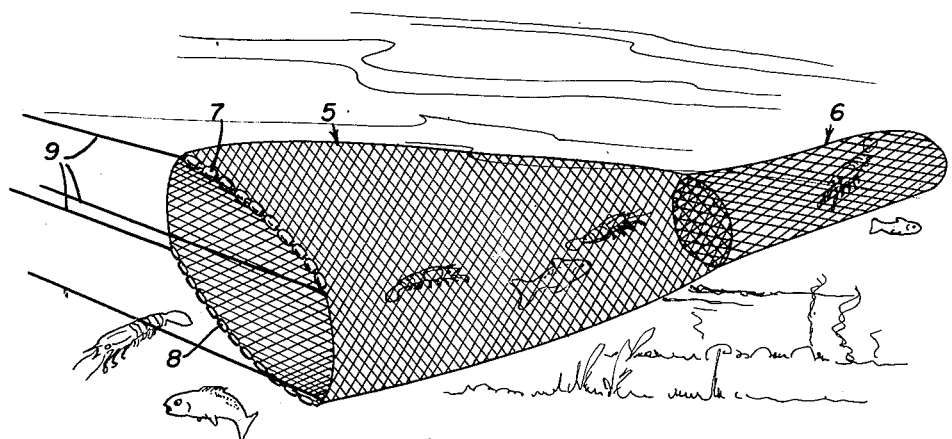
Figure 1 is a perspective view of a shrimp trawling net having a tail bag constructed in accordance with the present invention.

Referring in detail to the drawing, the shrimp trawling net shown consists generally of a funnel-shaped forward entrance portion 5 and a rear tail bag 6 to hold the entrapped catch, as usual. At its forward upper portion, the net has a cork line 7, while a lead line 8 is provided at the forward lower portion of the net. The usual tow lines 9 are provided for use in pulling or towing the net.

Figure 2:
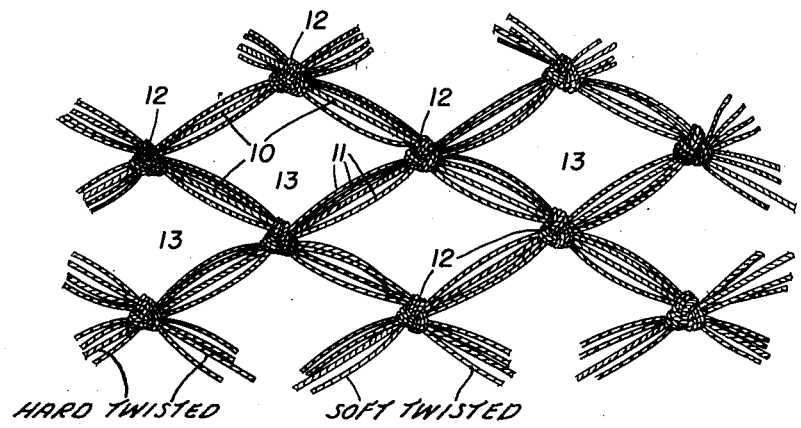
Figure 2 is an enlarged fragmentary perspective view showing a portion of the netting from which the tail bag of the net of Figure 1 is constructed.

In accordance with the present invention, the tail bag 6 is formed of netting of the special construction shown more clearly in Figure 2. This improved netting is composed of relatively large gauge hard twisted main cords 10, and a plurality of smaller gauge soft twisted cords 11 co-extensive and grouped with each main cord 10. The cords 10 and 11 are arranged and connected together by knots 12 to form the openings or meshes 13 in the netting.

In practice, when the netting is wetted, the portions of the soft twisted cords 11 between adjacent knots 12 and at the sides of each opening or mesh 13 will be slackened by the shrinking of the main cords 10. Thus, these slackened portions of the soft twisted cords will readily catch on the serrated rostrum of a shrimp attempting to escape from the bag, thereby effectively foiling such escape. At the same time, due to their shape and other characteristics, small fish of the waste variety may readily spread the meshes of the netting and escape from the latter. In practice, it has been found that a shrimp trawling net having a tail bag formed of special netting constructed as described above, will effectively carry out the stated object of the invention and will provide a very durable bag structure which may be readily and economically produced. The cords may be made of twisted cotton filaments or strands. As is well known in the art, the soft twisted cords have less twist per unit length than the hard twisted cords.

What we claim is:

1. A shrimp trawling net having a tail bag constructed to prevent escape of shrimp therefrom and to permit escape of small fish from the same, said tail bag being formed of netting composed of large guage hard twisted main cords, and a plurality of smaller gauge soft twisted cords coextensive and grouped with each main cord so as to catch on the serrated rostrum of a shrimp attempting to escape from the bag, said hard twisted and soft twisted cords being arranged and connected together by knots to form the openings or meshes in the netting and being unconnected between the knots.

2. A tail bag for a shrimp trawling net, formed of netting composed of relatively large gauge hard twisted main cords, and a plurality of smaller gauge soft twisted cords coextensive and grouped with each main cord so as to catch on the serrated rostrum of a shrimp attempting to escape from the bag, said cords being arranged and connected together by knots to form the openings or meshes in the netting and being unconnected between the knots.

LOUIS GUTHRIE.
CHARLES L. GUTHRIE.

REFERENCES CITED

The following references are of record in the file of this patent:

UNITED STATES PATENTS

| Number | Name | Date |
|---|---|---|
| 1,135,582 | Henkels | Apr. 13, 1915 |
| 1,867,281 | Runkle | July 12, 1932 |
| 1,897,224 | Andrews | Feb. 14, 1933 |
| 2,377,656 | Thomas | June 5, 1945 |
| 2,407,031 | D'Morcaldi | Sept. 3, 1946 |

FOREIGN PATENTS

| Number | Country | Date |
|---|---|---|
| 547,886 | Great Britain | Sept. 16, 1942 |